US 8,450,956 B2

(12) United States Patent
Kim

(10) Patent No.: US 8,450,956 B2
(45) Date of Patent: May 28, 2013

(54) APPARATUS AND METHOD FOR CONTROLLING OPERATION OF INVERTER SYSTEM

(75) Inventor: Hyo Jin Kim, Seoul (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 298 days.

(21) Appl. No.: 12/961,426

(22) Filed: Dec. 6, 2010

(65) Prior Publication Data

US 2011/0169434 A1    Jul. 14, 2011

(30) Foreign Application Priority Data

Jan. 8, 2010   (KR) .................. 10-2010-0001669

(51) Int. Cl.
*H02P 21/00*    (2006.01)
(52) U.S. Cl.
CPC ................................ *H02P 21/0035* (2013.01)
USPC ................ 318/400.02; 318/400.01; 318/700
(58) Field of Classification Search
CPC ................................................ H02P 21/0035
USPC ................... 318/400.02, 400.01, 700
See application file for complete search history.

(56) References Cited

U.S. PATENT DOCUMENTS

| 6,220,045 | B1 * | 4/2001 | Kim ............................ 62/228.4 |
| 6,396,229 | B1 * | 5/2002 | Sakamoto et al. ........ 318/400.02 |
| 6,825,637 | B2 * | 11/2004 | Kinpara et al. ............... 318/700 |
| 7,148,636 | B2 * | 12/2006 | Ueda et al. .................... 318/114 |

FOREIGN PATENT DOCUMENTS

| JP | 5-146187 | 6/1993 |
| JP | 2003079181 | 3/2003 |
| JP | 2003102105 | 4/2003 |
| JP | 2003-265000 | 9/2003 |
| JP | 2005198402 | 7/2005 |

OTHER PUBLICATIONS

Japan Patent Office Application Serial No. 2011-000340, Office Action dated Jan. 22, 2013, 3 pages.
Korean Intellectual Property Office Application Serial No. 10-2010-0001669, Office Action dated Apr. 20, 2011, 2 pages.
Japan Patent Office Application Serial No. 201010600780.5, Office Action dated Nov. 11, 2012, 8 pages.
State Intellectual Property Office of the People's Republic of China Application Serial No. 201010600780.5, Office Action dated Nov. 5, 2012, 8 pages.

* cited by examiner

*Primary Examiner* — Bentsu Ro
*Assistant Examiner* — David Luo
(74) *Attorney, Agent, or Firm* — Lee, Hong, Degerman, Kang & Waimey

(57) ABSTRACT

An apparatus for controlling operation of inverter system configured to drive a motor by using an inverter, and to normally operate the motor in a resonance-generated frequency band if the resonance occurs, and a method thereof are disclosed, wherein the method includes detecting a current outputted by an inverter system to a motor, if an operation frequency of the motor is in a resonance frequency band, converting the detected current to a d axis current and a q axis current, calculating a difference between the converted d axis current and pre-sampled d axis current (magnetic flux portion), multiplying the calculated difference by a preset comparative control gain to calculate a comparative control voltage, and adding the calculated comparative control voltage to a torque portion voltage responsive to an operation frequency of the motor to generate a driving voltage of the motor.

3 Claims, 2 Drawing Sheets

APPARATUS AND METHOD FOR CONTROLLING OPERATION OF INVERTER SYSTEM

Pursuant to 35 U.S.C. §119 (a), this application claims the benefit of earlier filing date and right of priority to Korean Patent Application No. 10-2010-0001669, filed on Jan. 8, 2010, the contents of which are hereby incorporated by reference in their entirety.

BACKGROUND OF THE DISCLOSURE

1. Field

The present disclosure relates to an apparatus and method for controlling operation of inverter system, and more particularly to an apparatus for controlling operation of inverter system configured to drive a motor by using an inverter, and to normally operate the motor in a resonance-generated frequency band if the resonance occurs, and a method thereof.

2. Background

In general, a mechanical resonance frequency exists in a motor that is generated from the motor itself. An inverter system accurately driving the motor and parts such as transformers mounted on the inverter system also have intrinsic electrical resonance frequency.

In a case a motor is driven by an inverter system including a general inverter and a cascade H-bridge type high voltage inverter, a new resonance frequency caused by mutual influences among the parts as well as intrinsic resonance frequency of each part are generated.

In a case the motor is driven by the inverter system in the abovementioned resonance frequency, the inverter system is not normally operated due to over-current. Furthermore, the motor may be damaged by the over-current, and in worst case, a rotation shaft of the motor may be twisted or broken.

Although many efforts are being waged to remove the resonance frequency in manufacturing/designing an inverter system in consideration of durability and mechanical combination, there is no way of completely removing the resonance frequency.

Therefore, as a way of avoiding an operation in the resonance frequency in the conventional inverter system, the motor is made not to normally operate in a frequency band in which the resonance frequency is generated, but to pass the frequency band the resonance frequency is generated in.

That is, the conventional system of avoiding the resonance frequency used a frequency jump method. In the frequency jump method, a resonance frequency band, i.e., a lowermost frequency and an uppermost frequency, is detected in which a current hunting is generated while the motor is driven where the inverter system is under no load, and then, a target frequency where the inverter system drives the motor is made not to be set up between the lowermost and the uppermost frequency.

However, the frequency jump method has disadvantageous in that it is so made as not to set up the target frequency at the resonance frequency band, such that it is very difficult to prevent the motor from passing the resonance frequency band and to avoid the current hunting. Another disadvantage in the frequency jump method is that it is not to remove the resonance frequency band but to avoid the same, such that an acceleration time of the motor is lengthened, and the over-current hunting is continued if the motor is operated in the resonance frequency band.

SUMMARY OF THE DISCLOSURE

There is provided an apparatus for controlling operation of inverter system as one general aspect of the present disclosure, the apparatus comprising: a current detector configured to detect a current outputted by an inverter system to a motor; a d axis/q axis current converter configured to convert the current detected by the current detector to a d axis current and a q axis current; a subtracter configured to calculate a difference between a pre-sampled d axis current (magnetic flux portion) and the d axis current; a comparative controller configured to multiply an output current from the subtracter by a preset comparative control gain to generate a comparative control voltage; and an adder configured to add the comparative control voltage to a torque portion voltage responsive to an operation frequency of the motor to output the added value as a driving voltage of the motor.

There is provided a method for controlling operation of inverter system as another general aspect of the present disclosure, the method comprising: detecting a current outputted by an inverter system to a motor, if an operation frequency of the motor is in a resonance frequency band; converting the detected current to a d axis current and a q axis current; calculating a difference between the converted d axis current and pre-sampled d axis current (magnetic flux portion); multiplying the calculated difference by a preset comparative control gain to calculate a comparative control voltage; and adding the calculated comparative control voltage to a torque portion voltage responsive to an operation frequency of the motor to generate a driving voltage of the motor.

In some exemplary embodiments of the present disclosure, the method may further include driving the motor using the torque portion voltage responsive to the operation frequency of the motor, if the operation frequency of the motor is not in the resonance frequency band.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
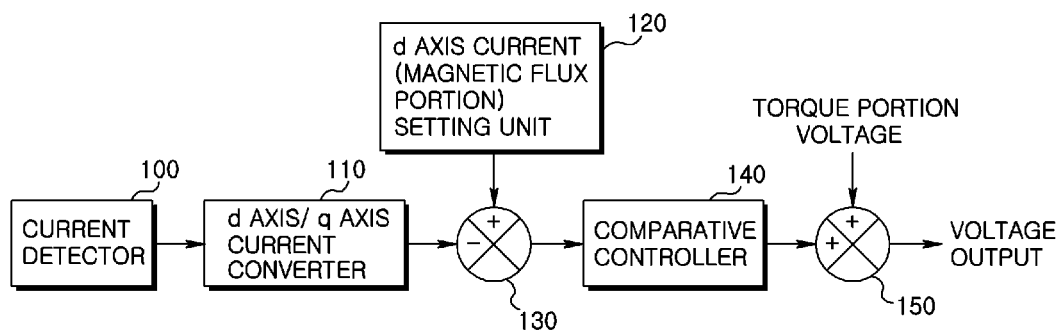
FIG. 1 is a block diagram illustrating configuration of an apparatus for controlling operation of inverter system according to an exemplary embodiment of the present disclosure.

Hereinafter, exemplary embodiments of the present disclosure are described in detail with reference to the accompanying drawings. In the drawings, sizes or shapes of constituent elements may be exaggerated for clarity and convenience.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification.

FIG. 1 is a block diagram illustrating configuration of an apparatus for controlling operation of inverter system according to an exemplary embodiment of the present disclosure, where reference numeral 100 is a current detector.

The current detector 100 may detect a current for driving a motor outputted by an inverter system. For example, the current detector 100 may detect a 3-phase current outputted by the inverter system to the motor by connecting a current transformer to the cable connected between the inverter system and the motor.

Reference numeral 110 is a d axis/q axis current converter, which converts a detection current of the current detector 100 to a d axis current and a q axis current. Reference numeral 120 is a d axis current (magnetic flux portion) setting unit, which sets up the pre-sampled d axis current (magnetic flux portion) in response to a user manipulation.

Reference numeral 130 is subtracter, which calculates a difference the pre-sampled d axis current (magnetic flux portion) outputted by the d axis current (magnetic flux portion) setting unit 120 and the d axis current converted by the d axis/q axis current converter 110. Reference numeral 140 is a comparative controller, which multiplies an output current from the subtracter 130 by a preset comparative control gain to generate a comparative control voltage. Reference numeral 150 is an adder, which adds the comparative control voltage of the comparative controller 140 to a torque portion voltage responsive to an operation frequency of the motor to output the added value as a driving voltage of the motor.

An apparatus for controlling operation of inverter system thus configured detects a current outputted from the inverter system to the motor by the current detector 100 if the motor is operated on the resonance frequency, and the detected current is converted by the d axis/q axis current converter to the d axis current and q axis current. At this time, the q axis current is constant even though the motor is operated in the resonance frequency. However, the d axis current generates current hunting if the motor is operated in the resonance frequency.

Therefore, the subtracter 130 according to the present disclosure calculates a difference between the pre-sampled d axis current (magnetic flux portion) outputted by the d axis current (magnetic flux portion) setting unit 120 and the d axis current. That is, in a case the d axis current is greater than the pre-sampled d axis current (magnetic flux portion), the substracter 130 subtracts the pre-sampled d axis current (magnetic flux portion) from the d axis current to calculate the difference. In a case the d axis current is smaller than the pre-sampled d axis current (magnetic flux portion), the subtracter 130 subtracts the d axis current from the pre-sampled d axis current (magnetic flux portion) to calculate the difference.

In a case the difference between the d axis current and the pre-sampled d axis current (magnetic flux portion) is calculated by the subtracter 130, the comparative controller 140 multiples the output current of the substractor 130 by the preset comparative control gain to generate a comparative control voltage.

The comparative control voltage generated by the comparative controller 140 is outputted to the adder 150 to allow a driving frequency of the motor to be added to a torque portion voltage, and the driving voltage in which the torque portion voltage is added by the comparative control voltage is outputted to the inverter system to be used for driving the motor.

Figure 2:
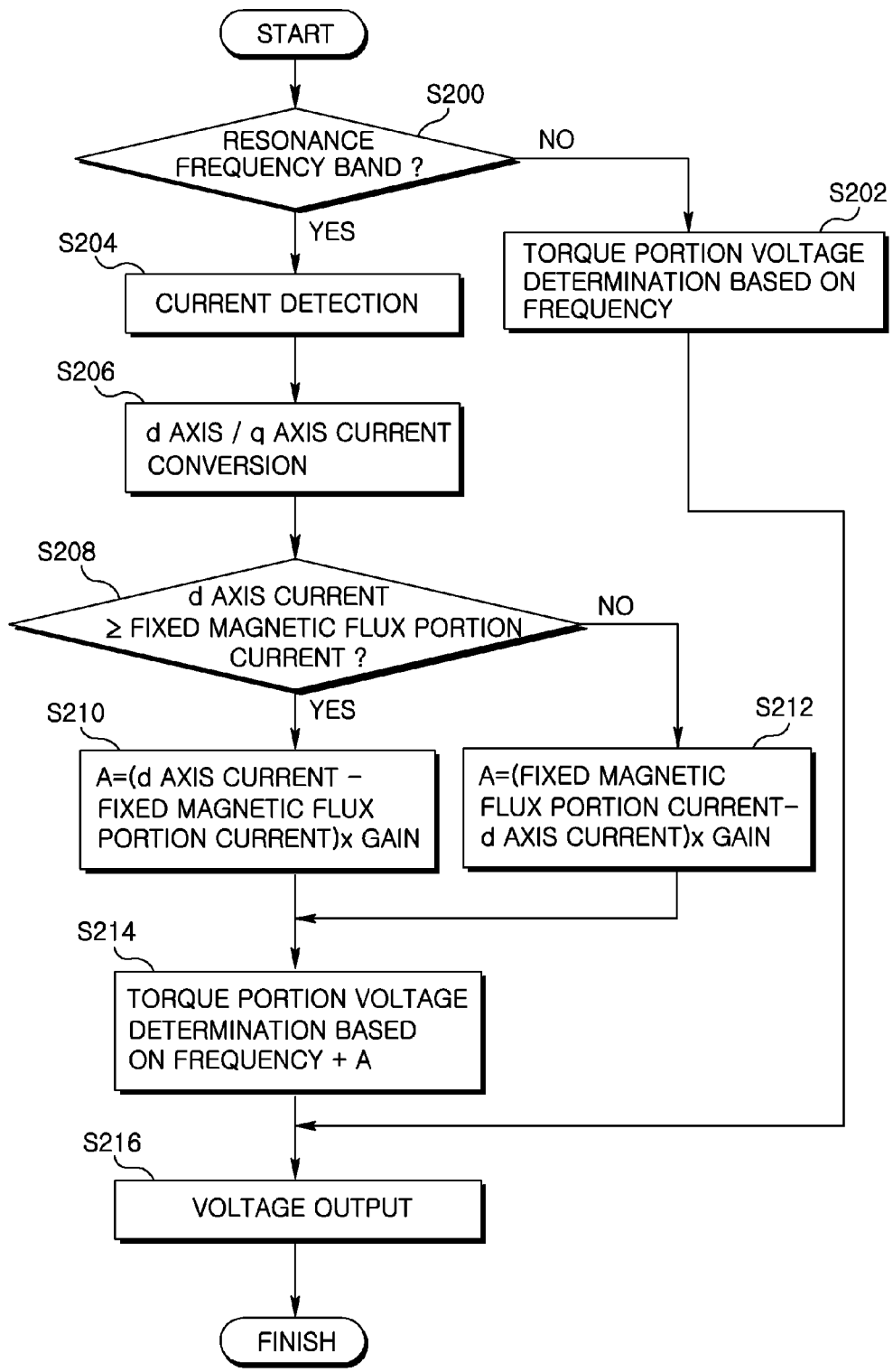
FIG. 2 is a signal flowchart illustrating a method for controlling operation of inverter system according to an exemplary embodiment of the present disclosure.

FIG. 2 is a signal flowchart illustrating a method for controlling operation of inverter system according to an exemplary embodiment of the present disclosure.

Referring to FIG. 2, a controller mounted on the inverter system determines whether an operation frequency in which the inverter system operates the motor is the resonance frequency band (S200).

As a result of the determination, if it is determined that the operation frequency in which the inverter system currently operates the motor is not the resonance frequency band, the controller determines a torque portion voltage based on the operation frequency in which the motor is operated (S202), and outputs the determined torque portion voltage to allow the inverter system to drive the motor in response to the torque portion voltage (S216).

As a result of the determination (S200), if it is determined that the operation frequency in which the inverter system currently operates the motor is the resonance frequency band, the current detector 100 detects a current outputted to the motor by the inverter system (S204), and the d axis/q axis current converter 110 converts the detected current to d axis current and q axis current (S206).

If the current conversion is completed at the S206 step, the controller compares sizewise the d axis current with the pre-sampled d axis current (magnetic flux portion) outputted by the d axis current (magnetic flux portion) setting unit 120 (S208).

As a result of the comparison, if the d axis current is greater than the pre-sampled d axis current (magnetic flux portion), the subtracter 130 subtracts the pre-sampled d axis current (magnetic flux portion) from the d axis current, and the comparative controller 140 multiplies the subtracted current by the preset comparative control gain to calculate a comparative control voltage (A) (S210).

As a result of the comparison, if the d axis current is smaller than the pre-sampled d axis current (magnetic flux portion), the subtracter 130 subtracts the d axis current from the pre-sampled d axis current (magnetic flux portion), and the comparative controller 140 multiplies the subtracted current by the preset comparative control gain to calculate a comparative control voltage (A) (S212).

In a case the comparative control voltage (A) is calculated, the adder adds the comparative control voltage (A) to the torque portion voltage responsive to the operation frequency in which the motor is operated to generate a driving voltage (S214), and outputs the generated driving voltage to the inverter system for use in driving the motor.

The above-mentioned apparatus and method for controlling operation of inverter system according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

What is claimed is:

1. An apparatus for controlling operation of an inverter system, the apparatus comprising:
   a current detector configured to detect a current output by the inverter system to a motor;

a d-axis/q-axis current converter configured to convert the current detected by the current detector into a first d-axis current and a q-axis current;

a subtracter configured to calculate a difference between a second d-axis current and the first d-axis current, the second d-axis current including a d-axis current sampled during a previous period;

a comparative controller configured to multiply a current output from the subtracter by a preset comparative control gain in order to generate a comparative control voltage; and an adder configured to add the comparative control voltage to a torque portion voltage that is responsive to an operation frequency of the motor in order to output an added value to the inverter system as a driving voltage of the motor.

2. A method for controlling operation of an inverter system, the method comprising:

detecting a current output by the inverter system to a motor, if an operation frequency of the motor is in a resonance frequency band;

converting the detected current into a first d-axis current and a q-axis current;

calculating a difference between the first d-axis current and a second d-axis current which includes a d-axis current sampled at a previous period;

multiplying the calculated difference by a preset comparative control gain in order to calculate a comparative control voltage;

adding the comparative control voltage to a torque portion voltage that is responsive to an operation frequency of the motor in order to generate a driving voltage of the motor; and outputting the driving voltage of the motor to the inverter system.

3. The method of claim 2, further comprising:

driving the motor using the torque portion voltage, if the operation frequency of the motor is not in the resonance frequency band.

* * * * *